Dec. 15, 1942. J. W. KINNUCAN 2,305,012
ENGINE LUBRICATION SYSTEM
Original Filed May 11, 1940  5 Sheets-Sheet 1
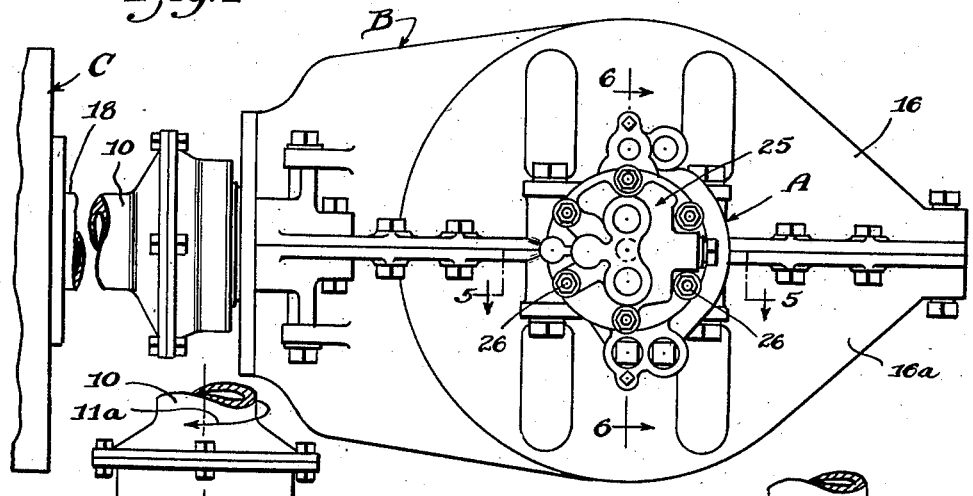
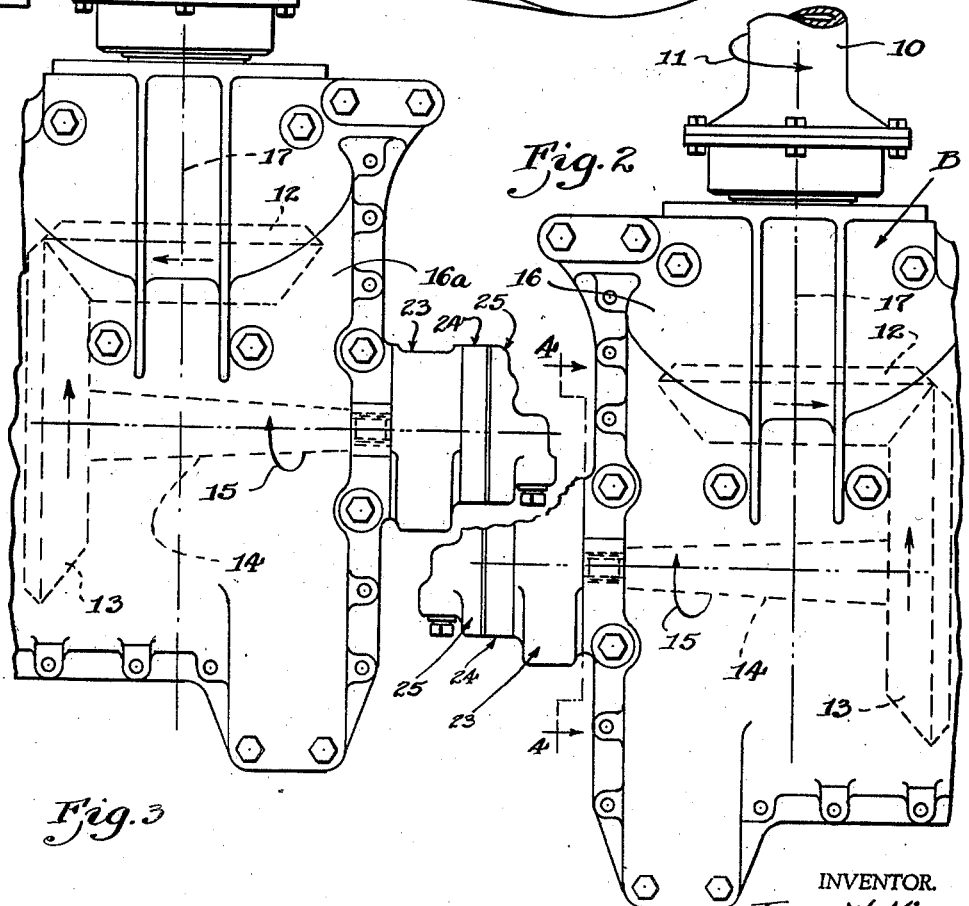
INVENTOR.
James W. Kinnucan
Attorney Dec. 15, 1942.    J. W. KINNUCAN    2,305,012
ENGINE LUBRICATION SYSTEM
Original Filed May 11, 1940    5 Sheets-Sheet 2
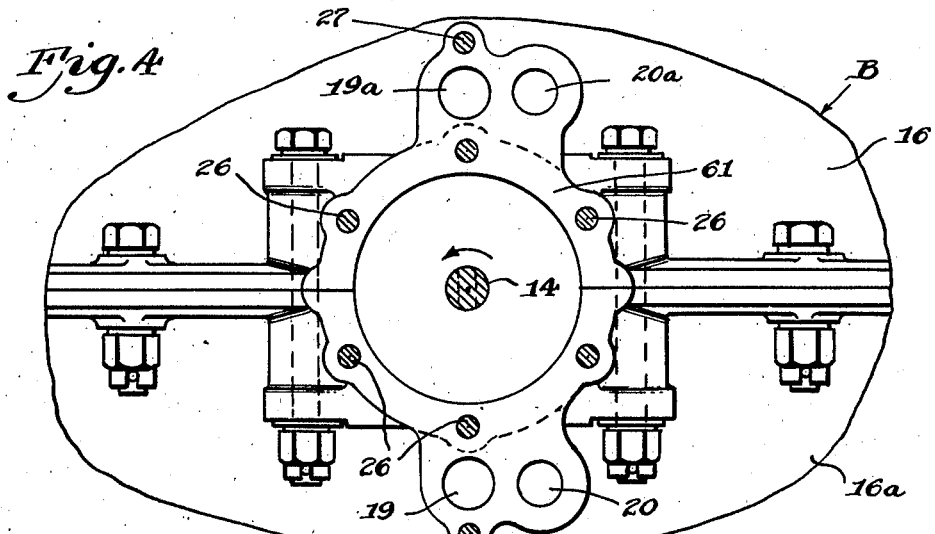
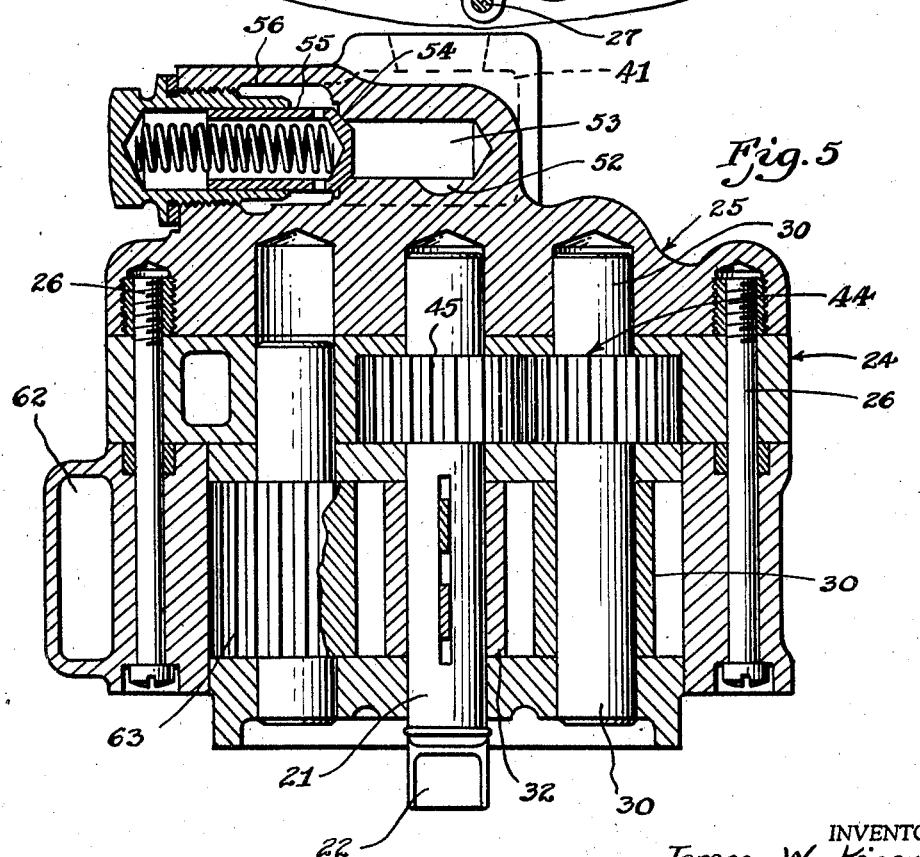
INVENTOR.
James W. Kinnucan
BY  J. F. Hauke.
Attorney Dec. 15, 1942.    J. W. KINNUCAN    2,305,012
ENGINE LUBRICATION SYSTEM
Original Filed May 11, 1940    5 Sheets-Sheet 3

INVENTOR.
James W. Kinnucan
BY G. T. Hauke.
Attorney

Dec. 15, 1942.  J. W. KINNUCAN  2,305,012
ENGINE LUBRICATION SYSTEM
Original Filed May 11, 1940    5 Sheets-Sheet 4
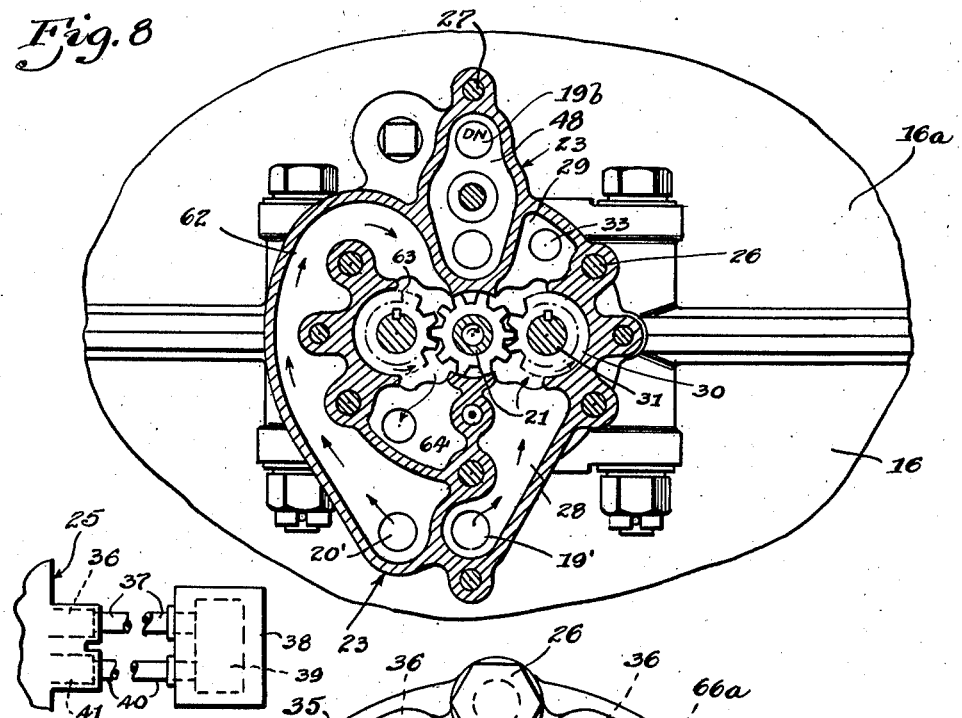
Fig. 8
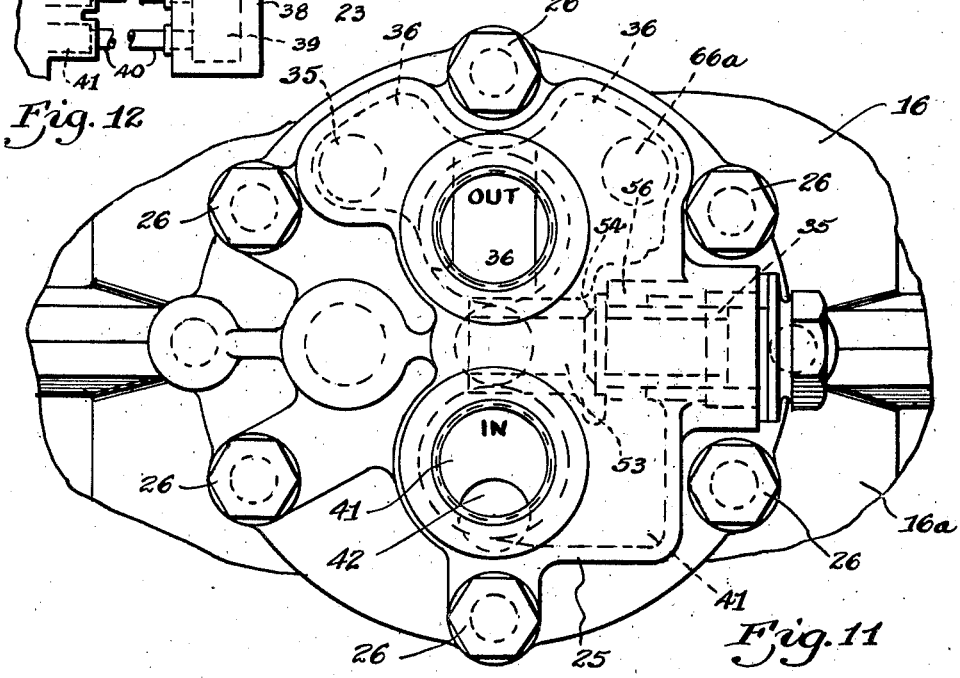
Fig. 12
Fig. 11
INVENTOR.
James W. Kinnucan
BY
G. F. Hauke
Attorney.

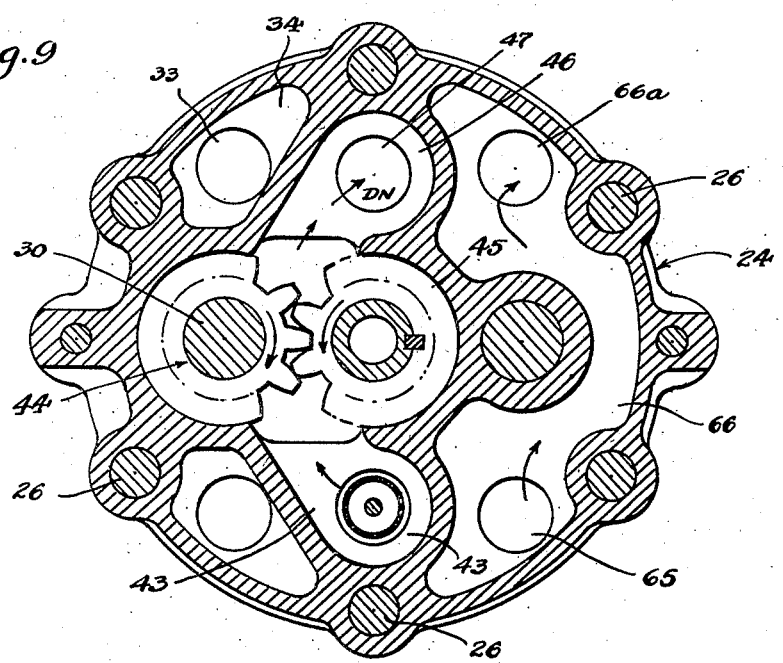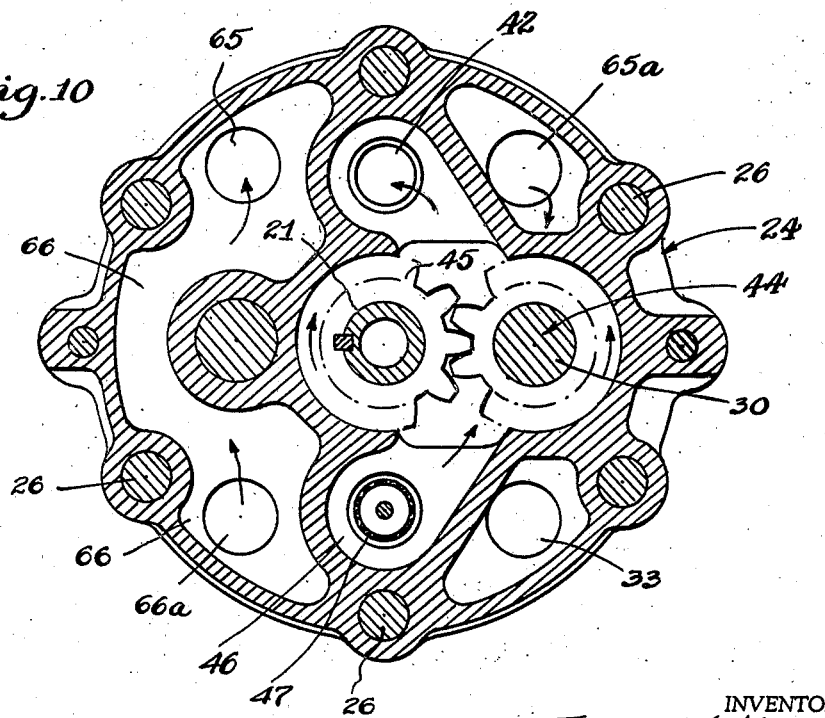

Patented Dec. 15, 1942

2,305,012

UNITED STATES PATENT OFFICE 2,305,012

ENGINE LUBRICATION SYSTEM

James W. Kinnucan, Detroit, Mich., assignor to Continental Aviation and Engineering Corporation, Detroit, Mich., a corporation of Virginia Original application May 11, 1940, Serial No. 334,765. Divided and this application March 10, 1942, Serial No. 434,136

9 Claims. (Cl. 184—6)

My invention relates to engines and more particularly to a lubricating pump adapted for operative assembly with an internal combustion engine. More specifically, my invention is related to pumps of the type which are interchangeable with right or left hand drive engines. In other words, the pump illustrated and described herein is one, which is adapted for assembly with an engine having a pump driving element rotating in one direction and also adapted for operative assembly with an engine having a pump driving element rotating in the opposite direction, merely by rearranging the component parts of the pump.

Internal combustion engines and particularly those manufactured for use in propelling aircraft are made to have crankshafts rotating in either direction; that is, right-hand drive engines are manufactured as well as left hand drive engines. Usually it is the practice to provide two different pump assemblies, one which is adapted to be drivingly connected with the right hand drive engine and the other to be drivingly connected with a left hand drive engine. Consequently, it is necessary to provide two complete and distinct pump assemblies, and to carry duplicate service parts as well as necessitating duplicate dies, fixtures and patterns for manufacturing these different pump structures.

An object of my present invention is to eliminate the difficulties aforesaid by providing a pump structure having component parts which may be assembled together in a predetermined arrangement for assembly with either a right or left hand drive engine; in other words, the present pump construction may be assembled with an engine having a pump driving shaft rotating in a clockwise direction or with an engine having a pump driving shaft rotating in a counterclockwise direction.

Another object of the present invention is to facilitate the manufacture and assembling of oil pumps for engines of the type described above by providing a sectional pump assembly embodying complementary pump portions which may be readily assembled in a predetermined relation for driving assembly with such engines.

A further object of my present invention is to provide an improved lubricating pump structure adapted for assembly with engine driving members or shafts having a clockwise or counterclockwise rotation by providing reversible pump sections which may be assembled together in a predetermined relation in order to be adapted for driving assembled with these engine drive shafts aforesaid.

For a more detailed understanding of my invention, refernce may be had to the accompanying drawings illustrating a preferred embodiment of my invention in which like parts are referred to by like characters throughout the several views, and in which:

Fig. 1 is a side elevational view of an engine transmission assembly showing my improved lubricating pump assembled therewith, Fig. 2 is a plan view thereof illustrating an engine drive including a pump drive shaft rotating in one direction, Fig. 3 is a fragmentary plan view similar to Fig. 2 but showing an arrangement in which the pump drive shaft is rotated in the opposite direction to that shown in Fig. 2, Fig. 4 is a detail fragmentary elevational view of a two part engine transmission assembly, showing the pad on which the lubricating pump is assembled and illustrating the lubricant inlet and outlet openings formed in said engine transmission assembly, Fig. 5 is an assembled sectional view through the pump assembly taken substantially on the line 5—5 of Fig. 1, Fig. 6 is a vertical sectional view through the pump assembly taken on the line 6—6 of Fig. 1, Fig. 7 is a sectional view through the pump taken on the line 7—7 of Fig. 6, Fig. 8 is a sectional view similar to Fig. 7 but showing the pump reversely assembled for operative connection with a pump drive shaft rotating in the opposite directions to that shown in Fig. 7 and which is adapted for assembly with the mechanism generally illustrated in Fig. 3, Fig. 9 is a sectional view through the pump taken on the line 9—9 of Fig. 6, Fig. 10 is a sectional view similar to Fig. 9 but showing the same reversed for assembly with a reversed pump construction, Fig. 11 is a plan view of the pump, particularly illustrating the construction of the outermost pump casing part, and Fig. 12 is a fragmentary diagrammatic view illustrating a portion of the external lubricating system.

This application is a division of my application for Patent Ser. No. 334,675, filed May 11, 1940 for Lubricating pump.

The pump structure illustrated and described herein preferably consists of a structure formed of complementary portions assembled together and indicated as a whole by the reference character A, and bolted or otherwise secured to an exterior portion of an engine gear transmission indicated as a whole by the reference character B. The internal gearing mounted within this transmission is not claimed per se in this application since the same is described and claimed in my co-pending application Ser. No. 331,201, filed April 23, 1940. The internal gearing within this transmission is, however, drivingly connected with a driving shaft 10 (Fig. 1) driven in a conventional manner from the engine crankshaft carried by the engine C.

In Fig. 2, the arrow 11 indicates the driection of the engine rotation associated therewith and arrow 11a in Fig. 3 illustrates the direction of rotation of the engine associated therewith. It will be noted that the direction of rotation of the engines respectively connected with the assemblies of Figs. 2 and 3 are reversed with respect to each other. The gearing embodied in the transmission B includes a bevelled gear 12 drivingly connected to the driving shaft 10, this bevelled gear 12 meshing with another bevelled gear 13 which drives the pump drive shaft 14, arrows 15 indicating the direction of rotation of the pump drive shafts 14. It will be noted though, that the pump drive shaft 14 in Fig. 3 rotates in the opposite direction with respect to the pump drive shaft 14 of Fig. 2.

The transmission B comprises a casing or gear box structure consisting of upper and lower interchangeable sections 16 and 16a. In Figs. 1 and 2 the assembly is adapted for a right hand drive engine, but when adapting this transmission assembly to an engine rotating in the opposite direction, it is necessary to turn the transmission assembly over, in which event the upper section of the casing is 16a while the lower casing is 16, exactly the reverse from that shown in Figs. 1 and 2. Preferably, the transmission structure is rotated through an angle of 180 degrees about the axis 17 which is coaxial with the engine crankshaft 18. These interchangeable gear casings 16 and 16a are constructed identical to each other, and it will be noted by referring to Fig. 4 that each of the casings 16 and 16a are provided with casing ports 19, 20 and 19a, 20a.

Referring particularly to Figs. 6, 7, 9 and 11, it will be noted that the pump drive shaft 14 is drivingly connected with the pump shaft 21 in any suitable manner, such as by a tongue and groove connection 22. The pump structure consists of three complementary parts or casing sections, the inner one designated as a whole by reference character 23, the middle section by the reference character 24, and the outer section by the reference character 25. Suitable bolts 26 are employed to secure the pump unit to the transmission casing B and it will be noted that these bolts pass through the pump sections or portions and securely bolt the pump assembly to the casings 16 and 16a of the transmission B. Preferably, the inner pump section 23 is bolted to the transmission casing by bolts 27, said section 23 seating on the pad 61 carried by said transmission casing and causing the ports 19' and 20' to respectively register with the casing ports 19 and 20.

The operation of the pump when assembled in the relationship shown in Figs. 6, 7, 9 and 11, is as follows. The lubricant or oil is scavenged from the transmission case through the scavenge port 19. The lubricant or oil is thus carried through the passage or chamber 28 and is pumped into the chamber 29 by means of the gear pump assembly supported within this pump section 23. It will be noted that the pump gear 30 is supported on the shaft 31 and meshes with the pump gear 32 keyed to the pump drive shaft 21. The lubricant or oil is caused to be pumped into the chamber 29 from chamber 28 and thence flows outwardly through the port 33 into the chamber 34 carried by the pump section 24, and thus outwardly through port 35 into the chamber 36 in the pump section 25 then outwardly through the oil line or conduit 37 into a tank or reservoir 38 in which oil cooling devices 39 are preferably assembled.

The oil or lubricant is taken from this tank or reservoir 38 through an oil line or conduit 40 into a chamber 41 carried by the pump section 25. Thence inwardly through port 42 into the chamber 43 in the pump section 24. The oil is then pumped by the gear pump assembly 44 which includes a driving gear 45 driven by the pump shaft 21 into the chamber 46. The oil blows through the port 47 into the chamber 48 carried by the pump section 23, and thence through this chamber and out through the port 19b into the oil passage 19a in the transmission case.

If, for any reason, the oil line or passage 19a becomes clogged or stopped, and the oil is prevented from flowing into this line, the oil is forced to take another path, same being caused to flow through the port 51 into passage 52 and into the passage 53 which terminates in an outlet 54 closed by a spring pressed valve 55 commonly referred to as a pressure relief valve. The oil pressure will lift the valve 55 off its seat and will permit the oil to flow into chamber 56 (see Fig. 11) from which chamber the oil flows into chamber 41 which is constructed in open communication with chamber 56. Thus the oil is merely by-passed so as to flow again and again through the oil pump structure 44, identified as a pressure pump.

Referring to Figs. 8, 10 and 11, it will be noted that the pump section 23 is turned over which brings the face 60 of pump section 23 into an abutting relation with the pad 61 carried by the transmission casing. It will be noted that the ports 19 and 20 carried by the transmission casing are interchanged with respect to the ports 19a and 20a because of the fact that the transmission casing sections 16 and 16a have been interchanged, and the pump section 23 is also reversed in order to respectively register the ports 19b and 20b with the ports 19 and 20. It will be noted that the transmission ports register in both positions with the pump casing ports, and that ports 19 and 20 (see Fig. 4) are scavenging oil outlet ports and that the ports 19a and 20a are connected with the oil pump outlet ports. When the ports are assembled as in Fig. 3 the ports 19a and 20a become the scavenging oil outlet ports and ports 19 and 20 are connected with the pump outlet ports. The oil flowing through the pump casing port 20 and port 20', flows into the passage 62 then by the gear pump element 63 into the passage 64, then outwardly through port 65 into the chamber 66, then outwardly from chamber 66 through port 66a into the chamber 36 in pump section 25, where it joins the oil coming from port 35 and goes outwardly through the oil line or conduit 37.

It will be noted that the circulation of oil through the pump assembly illustrated in Figs. 8, 10 and 11 is through the same passages and chambers as illustrated in Figs. 6, 7, 9 and 11 and this is accomplished by reason of the fact that the pump drive shaft 21 is rotated in the opposite direction. In Fig. 8 it will be noted that the pump section 23 is turned end for end whereas the pump section 24 is rotated about the pump shaft 21 through an angle of 180 degrees (see Fig. 10). The pump section 25 remains in the same relative position, or in other words is not turned end for end nor is it rotated. The arrows in Figs. 8 and 10 illustrate the direction of oil flow in this particular pump assembly.

It will thus be seen that I have provided a unitary pump structure embodying complementary portions, which are adapted for assembly together in either one of two predetermined relations. Thus, I have provided a pump structure which is adapted for assembly with pump driving means rotating in two different directions. These two pump assemblies embody identical pump sections, and it will be readily seen that the manufacture of pumps of this character may be had with a minimum of tool and fixture expense. Furthermore, these pumps can be more economically serviced because of the elimination of the necessity of carrying duplicate service parts. Either type of pump can be serviced with the same part.

The present pump construction is particularly adapted for assembly with a reversible gear transmission assembly such as is illustrated and described in my co-pending application aforesaid, the pump inlet and outlet ports being designed to respectively register with the casing outlet and inlet ports in both assemblies illustrated in Figs. 2 and 3.

Although I have described in detail but one embodiment of my invention, it will be apparent to those skilled in the art to which my invention pertains, that various modifications and changes may be made therein without departing from the spirit of my invention or from the scope of the appended claims.

I claim:

1. In an engine construction of the character described the combination of a gear case structure having interchangeable upper and lower gear case sections and having oil inlet and outlet ports, an oil pump assembly secured to said gear case structure and including a casing assembly constructed for operative assembly with either set of said inlet and outlet ports.

2. In an engine construction of the character described the combination of a gear case structure having interchangeable upper and lower gear case sections and provided with oil inlet and outlet ports, an oil pump assembly secured to said gear case structure and including a casing assembly comprising a plurality of complementary casing portions and constructed for selective operative assembly with either set of said inlet and outlet ports.

3. In an engine construction of the character described the combination of a gear case structure having interchangeable upper and lower gear case sections provided with oil inlet and outlet ports, an oil pump assembly secured to said gear case structure and including a casing assembly comprising a plurality of complementary reversible casing portions, one of said portions having identical opposite faces for abutting attachment with the gear case structure for selective operative assembly with either set of said inlet and outlet ports.

4. In an engine construction of the character described, the combination of a two part gear case structure having interchangeable upper and lower gear case sections having oil inlet and outlet ports, an oil pump assembly secured to said gear case structure and including a multiple casing assembly constructed for operative assembly with either of said set of inlet and outlet ports.

5. In an engine construction of the character described, the combination of a two part gear case structure having interchangeable upper and lower gear case sections having oil inlet and outlet ports, an oil pump assembly secured to said gear case structure and comprising a multiple casing assembly including a reversible section constructed and arranged for operative assembly with said gear case structure and having inlet and outlet ports registering with the inlet and outlet ports of said gear case structure.

6. In an engine construction of the character described, the combination of a two part gear case structure having interchangeable upper and lower gear case sections having oil inlet and outlet ports, an oil pump assembly secured to said gear case structure and comprising a multiple casing assembly including a reversible section having inlet and outlet ports, inlet and outlet passages, and an oil pumping instrumentality operatively driven by said engine, said reversible pump section constructed and arranged for selective assembly with the gear case structure in either of said two interchanged positions and to register said inlet and outlet ports respectively with said gear case outlet and inlet ports.

7. In an engine construction of the character described, the combination of a two part gear case structure having interchangeable upper and lower gear case sections and a pump drive shaft connected with said engine and selectively rotated in opposite directions when said gear case sections are interchanged, and an oil pump assembly secured to said gear case structure and comprising a multiple casing assembly including reversible sections, one of said sections secured directly to said gear case structure and having inlet and outlet ports selectively registering with the outlet and inlet ports respectively of said gear case structure in either of said two interchanged positions.

8. In an engine construction of the character described, the combination of a two part gear case structure having interchangeable upper and lower gear case sections, a pump drive shaft supported by said gear case structure and drivingly connected with said engine, said shaft being driven in the opposite direction on interchanging said upper and lower gear case sections, said sections having oil inlet and outlet ports, and a multiple casing oil pump assembly including a reversible section secured directly to said gear case structure in both interchanged positions of said gear case sections and having oil inlet and outlet ports registering respectively with the oil outlet and inlet ports of said gear case structure, and an oil pumping instrumentality operatively connected in driving relation with said pump drive shaft.

9. In an engine construction of the character described, the combination of a two part gear case structure having interchangeable upper and lower gear case sections, a pump drive shaft supported by said gear case structure and drivingly connected wtih said engine, said shaft being driven in the opposite direction on interchanging said upper and lower gear case sections, said sections having oil inlet and outlet ports, and a multiple casing oil pump assembly including a reversible section secured directly to said gear case structure in both interchanged position of said gear case sections and having oil inlet and outlet ports registering respectively with the oil outlet and inlet ports of said gear case structure, and an oil pumping instrumentality operatively connected in driving relation with said pump drive shaft, said reversible oil pump section constructed for 180-degree reversing about an axis extending normal to the plane of division between said upper and lower gear case sections on interchanging said gear case sections to respectively locate the oil inlet and outlet ports of said pump section in registration with the oil outlet and inlet ports of said gear case structure.

JAMES W. KINNUCAN.